(12) United States Patent
Akbaba et al.

(10) Patent No.: US 7,218,442 B2
(45) Date of Patent: May 15, 2007

(54) OPTICAL COMMUNICATIONS SYSTEM WITH FIBER BREAK DETECTION IN THE PRESENCE OF RAMAN AMPLIFICATION

(75) Inventors: Enis Akbaba, Westford, MA (US); John Jacob, Hollis, NH (US); Andrew Niall Robinson, Lincoln, MA (US); John Zyskind, Concord, MA (US); Erik Robert Thoen, Cambridge, MA (US)

(73) Assignee: JDS Uniphase Corporation, Milpitas, CA (US)

(*) Notice: Subject to any disclaimer, the term of this patent is extended or adjusted under 35 U.S.C. 154(b) by 0 days.

(21) Appl. No.: 10/906,759

(22) Filed: Mar. 4, 2005

(65) Prior Publication Data

US 2006/0198016 A1    Sep. 7, 2006

(51) Int. Cl.
*H01S 3/00* (2006.01)
*H04B 10/08* (2006.01)
*H04B 17/00* (2006.01)

(52) U.S. Cl. .......................... 359/334; 398/15; 398/25

(58) Field of Classification Search ................ 359/334; 398/15, 25
See application file for complete search history.

(56) References Cited

U.S. PATENT DOCUMENTS

| | | | |
|---|---|---|---|
| 5,317,660 A * | 5/1994 | Veith | 385/24 |
| 5,343,286 A * | 8/1994 | Keeble et al. | 356/73.1 |
| 5,355,250 A * | 10/1994 | Grasso et al. | 359/341.44 |
| 5,475,529 A * | 12/1995 | Takatu et al. | 359/341.1 |
| 5,491,572 A * | 2/1996 | Ohara | 398/15 |
| 5,966,206 A * | 10/1999 | Jander | 356/73.1 |
| 6,222,668 B1 * | 4/2001 | Dutrisac et al. | 359/337 |
| 6,243,195 B1 * | 6/2001 | Pedersen et al. | 398/9 |
| 6,344,915 B1 * | 2/2002 | Alexander et al. | 398/115 |
| 6,359,708 B1 * | 3/2002 | Goel et al. | 398/15 |
| 6,373,621 B1 * | 4/2002 | Large et al. | 359/334 |
| 6,423,963 B1 * | 7/2002 | Wu | 250/227.14 |
| 6,433,922 B1 * | 8/2002 | Ghera et al. | 359/334 |
| 6,483,616 B1 * | 11/2002 | Maddocks et al. | 398/1 |
| 6,504,630 B1 * | 1/2003 | Czarnocha et al. | 398/15 |
| 6,532,102 B2 * | 3/2003 | Kobayashi et al. | 359/334 |
| 6,547,453 B1 * | 4/2003 | Stummer et al. | 385/88 |
| 6,681,079 B1 | 1/2004 | Maroney | 398/15 |
| 6,687,426 B1 | 2/2004 | May et al. | 385/15 |
| 6,807,001 B1 * | 10/2004 | Ranka et al. | 359/341.3 |
| 6,856,454 B2 * | 2/2005 | Pavel et al. | 359/337 |
| 7,031,049 B2 * | 4/2006 | Kamada et al. | 359/334 |
| 2003/0152317 A1 * | 8/2003 | Brandon et al. | 385/24 |
| 2003/0161630 A1 * | 8/2003 | Jayaram et al. | 398/9 |
| 2004/0047628 A1 * | 3/2004 | Passier et al. | 398/15 |
| 2006/0140626 A1 * | 6/2006 | Robinson et al. | 398/30 |

* cited by examiner

OTHER PUBLICATIONS

Zyskind, et al., Optical Amplification System For Variable Span Length WDM Optical Communication Systems, U.S. Appl. No. 10/906,382, filed Feb. 17, 2005.

*Primary Examiner*—Deandra M. Hughes
(74) *Attorney, Agent, or Firm*—Allen, Dyer, Doppelt, Milbrath & Gilchrist, P.A.

(57) ABSTRACT

An optical communications system initiates automatic power reduction by selecting a portion of a Raman optical pumping signal from optical signals propagating on an optical fiber span. A signal related to a magnitude of the selected portion of the Raman optical pumping signal is generated. Power of at least one of the optical data signals and the optical pumping signals propagating in the optical fiber span is reduced in response to the generated signal.

10 Claims, 6 Drawing Sheets

OPTICAL COMMUNICATIONS SYSTEM WITH FIBER BREAK DETECTION IN THE PRESENCE OF RAMAN AMPLIFICATION

INTRODUCTION

The section headings used herein are for organizational purposes only and should not to be construed as limiting the subject matter described in the present application.

State-of-the art high-capacity optical communications systems use optical fibers to propagate optical data signals because optical fibers have very low optical attenuation and wide bandwidths. Many state-of-the art long-haul optical communications systems including optical transport systems that use wavelength division multiplexing (WDM) to simultaneously transmit many high capacity optical signals over a single optical fiber. Each optical signal propagating in the WDM optical communications system occupies its own wavelength within the gain spectrum of the optical amplifier.

Failures in the optical communications system can occur in many places. For example, failures can occur anywhere along the optical fiber span, which may be thousands of miles long. Failures can also occur in numerous telecommunication huts that amplify and process the optical signals, or in the transmitting and receiving equipment. When failures occur in optical communications systems, dangerous optical emissions can harm users and maintenance workers. Automatic power reduction (APR) systems and automatic laser shut-down (ALS) systems are often used to detect failures in the optical communications system and then to adjust the optical power present in the system to within safe limits.

BRIEF DESCRIPTION OF THE DRAWINGS

The aspects of this invention may be better understood by referring to the following description in conjunction with the accompanying drawings, in which like numerals indicate like structural elements and features in various figures. The drawings are not necessarily to scale. The skilled artisan will understand that the drawings, described below, are for illustration purposes only. The drawings are not intended to limit the scope of the present teachings in any way.

DETAILED DESCRIPTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

It should be understood that the individual steps of the methods of the present invention may be performed in any order and/or simultaneously as long as the invention remains operable. Furthermore, it should be understood that the apparatus of the present invention can include any number or all of the described embodiments as long as the invention remains operable.

Many known automatic power reduction (APR) systems and automatic laser shut-down (ALS) systems that are used to detect failures in optical communications systems detect Loss of Signal (LOS) on the data channel. Other APR systems and ALS systems detect Loss of Frame (LOF) on the Optical Supervisory Channel (OSC) and some APR systems and ALS systems detect both LOS on the data channel and LOF on the OSC. The term "optical supervisory channel" is sometimes referred to in the literature as an "optical service channel." Optical supervisory channels carry management information, such as alarms and provisioning information, to and from the transmission line elements to a network management system.

After the APR systems and ALS systems detect LOS on the data channel and/or LOF on the OSC they reduce power or shut down active components in the optical communications system, such as the transmitter and the repeater optical amplifiers. Many long-haul optical communications systems use repeater optical amplifiers to strengthen the optical signals and thus to improve the signal-to-noise ratio of the optical signals. Repeater optical amplifiers for WDM optical communications systems have wide gain spectrums and, therefore, can simultaneously provide gain over the range of wavelengths used in the WDM system. Many state-of-the art optical communications systems include repeater optical amplifiers that are designed to operate over span losses that are in the range of 20–25 dB.

Distributed Raman amplification (DRA) is used to amplify optical signals propagating in optical communications system that have very high span losses. The term "very high span losses" is defined herein to mean span losses that are greater than or equal to 30 dB. Distributed Raman amplification is well known in the art. Distributed Raman amplification propagates Raman optical pumping signals in the optical fiber span that amplify the optical data signal. In many optical communications systems, the Raman optical pumping signals exceed Class 1M limits and have significantly higher power levels than the optical data signal.

Distributed Raman amplification generates a significant amount of amplified spontaneous emission (ASE) optical power. The ASE generated by the DRA propagates in both directions along the optical fiber spans. Furthermore, other optical signals, such as OSC signals and back-scattered optical signals, can also have significant optical power levels.

The optical power added to the optical fiber spans as a result of the ASE generated by DRA and the other optical signals, such as OSC signals and back-scattered optical signals, can be high enough in long optical fiber spans to prevent the reliable detection of LOS on the data channel. Optical power from these sources is more likely to prevent the reliable detection of LOS on the data channel as span lengths increase and as span losses between optical amplifier repeaters increase.

Many known methods of remnant pump detection and automatic laser shut-down use loss of signal on the data channel to detect hazardous emissions. Optical communications systems using Raman amplification and which operate over high loss fiber spans between optical amplifier repeaters may not detect a potentially hazardous condition in optical fiber spans that propagate Raman optical pumping signals. In these known methods, users and maintenance workers can be harmed by the hazardous emission before the hazardous emission is detected at the other end of the optical fiber span and, consequently, shut down. Thus, there is a desire to build an optical fiber communications system with fiber break detection in the presence of Raman amplification.

Some known methods of remnant pump detection and automatic laser shut-down use communications, such as an OSC. Using communications, such as an OSC, will decrease reliability and may require a redundant trigger. Also, using communications, such as an OSC, will cause indeterminate latencies. In addition, since the OSC is typically not designed to carry revenue generating traffic, the OSC may not always be operational. Thus, there is also a desire to build an optical fiber communications system with fiber break detection that does not use an OSC or any other communications.

It is highly undesirable to generate a false indication of a fiber break that will unnecessarily bring down revenue generating traffic. Loss of signal on the data channel and LOF on the OSC can be unreliable indicators of a fiber break or other failure in optical communications systems. Thus, there is also a desire to build an optical fiber communications system with fiber break detection that does not generate false indications of a fiber break.

The methods and apparatus for fiber break detection according to the present invention enable a robust APR or ALS mechanism in the presence of DRA and other optical signals even in systems where span losses are very large. These methods and apparatus protect against hazards to users and maintenance workers from optical radiation while minimizing the portion of the line system that must be shut down in order to expedite the restoration of the line system when the hazard is eliminated. In addition, the methods and apparatus for fiber break detection according to the present invention do not require the use of communications, such as an OSC, which would decrease reliability, cause indeterminate latencies, and possibly interrupt signal channels bearing revenue generating traffic.

Figure 1:
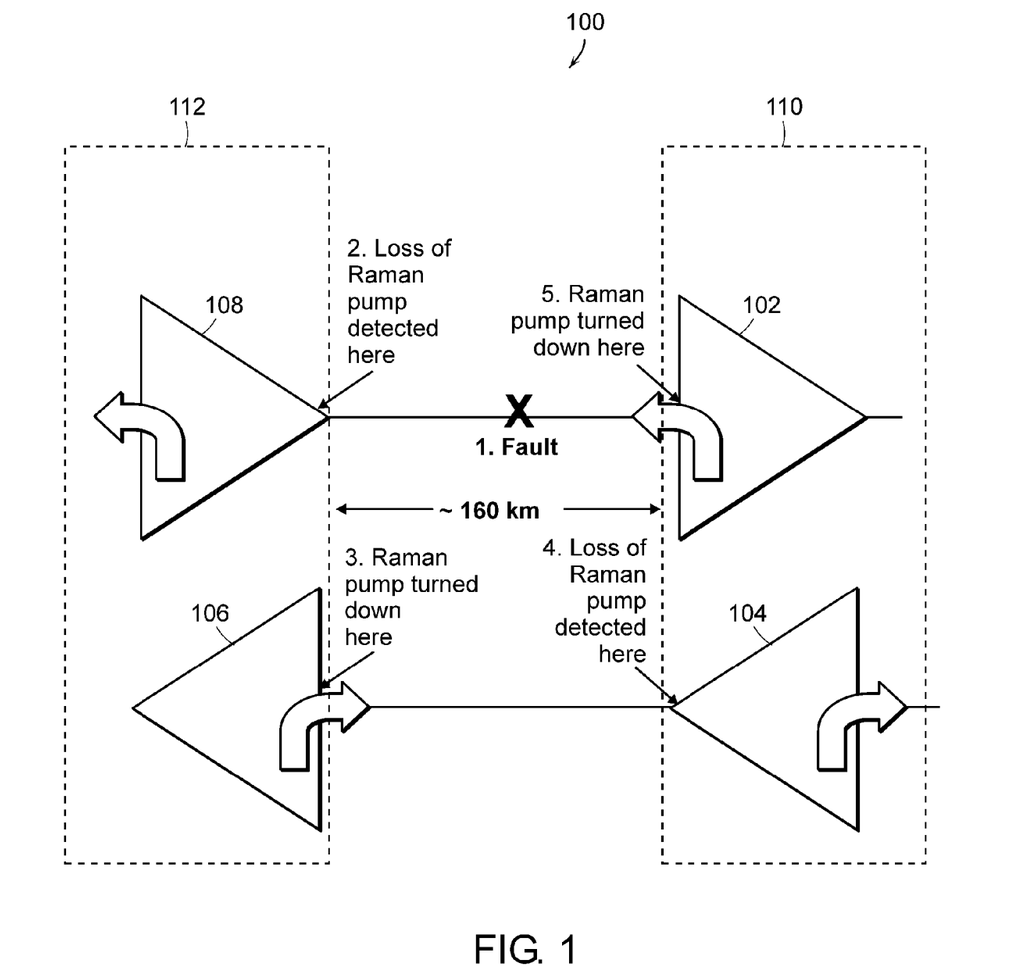
FIG. 1 illustrates a schematic diagram of a bi-directional hut-skipped optical communications system using remnant pump detection and automatic laser shut-down protection against hazardous emissions from counter-propagating Raman pump signals according to the present invention.

FIG. 1 illustrates a schematic diagram of a bidirectional hut-skipped optical communications system 100 using remnant pump detection and automatic laser shut-down protection against hazardous emissions from counter-propagating Raman pump signals according to the present invention. The system 100 includes a first 102, second 104, third 106 and fourth repeater optical amplifier 108. Each of the first, second, third, and fourth optical amplifiers 102, 104, 106, 108 include a Raman optical pump source.

The Raman optical pumping signals shown in this embodiment, counter-propagate with respect to the data signal, such that the Raman pump signal propagates from the optical amplifier 102 in the optical fiber span toward optical amplifier 108. The Raman pump signal from optical amplifier 106 propagates in the span toward optical amplifier 104. The Raman pump signals from optical amplifier 108 and 104 propagate in spans contiguous to that shown in FIG. 1. Each optical amplifier can also include a discrete optical amplifier.

The first and second repeater optical amplifiers 102, 104 are physically located in the same housing at a first location 110. The third and fourth repeater optical amplifiers 106, 108 are physically located in the same housing at a second location 112. The first and second locations 110, 112 are 160 km apart in this example, which is twice the typical spacing of long-haul repeater optical amplifiers.

For the purpose of illustrating the method of pump detection and automatic laser shut-down according to the present invention, a fiber break or connector pull between the first repeater optical amplifier 102 and the fourth repeater optical amplifier 108 is assumed. The fiber break or connector pull interrupts the path of the optical signals from the Raman optical pump source in the first repeater optical amplifier 102. A loss of the remnant optical pump signal is then detected at the fourth repeater optical amplifier 108.

The fourth repeater optical amplifier 108 then instructs the third repeater optical amplifier 106 to shut down or to reduce the output power of the Raman optical pump source in the third repeater optical amplifier 106. The Raman optical pump source in the third repeater optical amplifier 106 responds to the instructions from the fourth repeater optical amplifier 108 almost immediately because the third and the fourth repeater optical amplifiers 106, 108 are located in the same housing in the second location 112.

The second repeater optical amplifier 104 detects a loss of remnant Raman optical pump power because the third repeater optical amplifier 106 has shut down or reduced the output optical power of the Raman optical pump source in the third repeater optical amplifier 106. A loss of remnant Raman pump is detected by the fourth amplifier 104 when the third repeater 106 reduces the power of its Raman pump. The fourth repeater amplifier 104 then instructs the first repeater amplifier 102 to shut down or reduce the optical power generated by the Raman optical pump source in the first repeater amplifier 102. The hazard thread is then ended.

Figure 2:
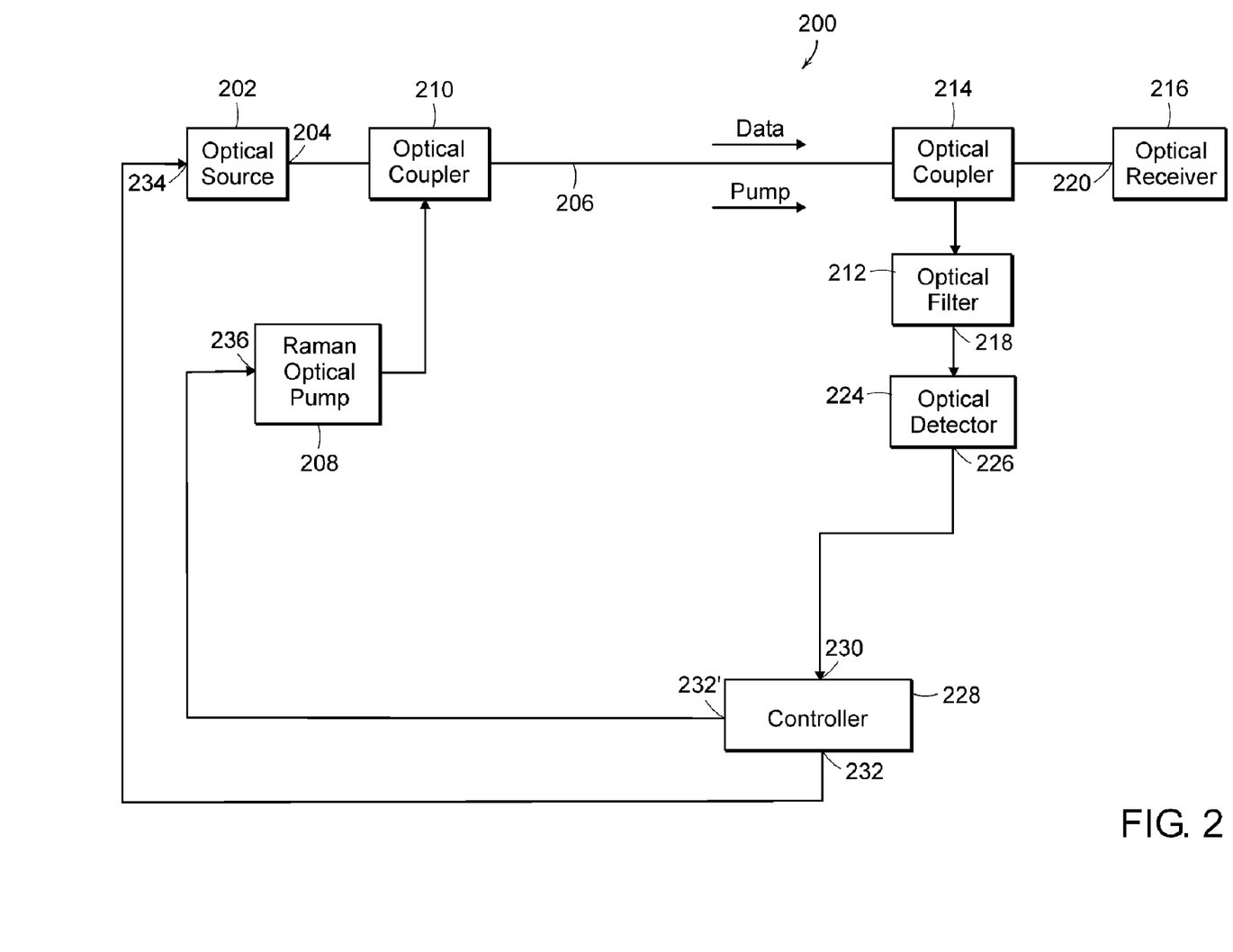
FIG. 2 illustrates one embodiment of an optical communications system with fiber break detection according to the present invention that includes a co-propagating Raman optical pump.

FIG. 2 illustrates one embodiment of an optical communications system 200 with fiber break detection according to the present invention that includes a co-propagating Raman optical pump. The optical communications system 200 includes an optical source 202 that generates optical data signals at an output 204. The optical source 202 is typically an optical transmitter that transmits optical data signals. In some embodiments, the optical power of the optical data signals generated by the optical source 202 can exceed Hazard Level 1M limits.

The output 204 of the optical source 202 is coupled to an optical fiber span 206. The optical fiber span 206 propagates the optical data signals. In one embodiment of the invention, the optical fiber span 206 is a high loss optical fiber span with an optical loss that is greater than about 32 dB. However, it is understood that methods and apparatus for fiber break detection can be used with standard and low-loss optical fiber spans.

A Raman optical pump source 208 that generates a Raman optical pumping signal is optically coupled into the optical fiber span 206 with an optical coupler 210. Numerous types of optical couplers that are known in the art can be used. In some embodiments, a separate optical coupler (not shown) can be used. Those skilled in the art will appreciate that in practical long haul optical communications systems, the optical fiber span 206 shown in FIG. 2 can be a single span in a multi-span optical communications system. In such systems, a data signal transmitter may be coupled into the input of a different optical fiber span.

The optical coupler 210 launches the Raman optical pumping signal in a direction that co-propagates with the optical data signals that are generated by the optical source 202. The Raman optical pumping signal amplifies the optical data signals propagating on the optical fiber span 206. The Raman optical pumping signal can exceed Class 1M limits and, in fact, can have a much higher optical power than the optical data signal.

In the embodiment shown in FIG. 2, both the optical data signals and the optical pumping signal co-propagate in the optical fiber span 206 as indicated by the data and pump arrows adjacent to the optical fiber span 206. In other embodiments, the optical pumping signal counter-propagates in the optical fiber span with the optical data signals. In yet other embodiment, a first optical pumping signal co-propagates with the optical data signals and a second optical pumping signal counter-propagates with the optical data signals.

An optical filter 212 is optically coupled to the optical fiber span 206 with an optical coupler 214 at a location that is downstream from the optical source 202 and near the optical receiver 216. The optical filter 212 passes a portion of the Raman optical pumping signal at an output 218. The optical receiver 216 includes an input 220 that is optically coupled to the optical fiber span 206 at the location that is downstream from the optical source 202. The optical receiver 216 receives the optical data signals propagating in the optical fiber span 206 that are not coupled out of the optical fiber span 206 by the optical coupler 214 and directed to the optical filter 212.

In one embodiment of the invention, the optical filter 212 is designed to reject amplified spontaneous emission that is generated in the optical fiber span by the Raman optical pumping signal. Also, in some embodiments, the optical filter 212 is designed to reject back-scattered optical signals. In addition, in some embodiments, the optical filter 212 is designed to reject optical signals that propagate in an optical supervisory channel.

An optical detector 224 is optically coupled to the output 218 of the optical filter 212. The optical detector 224 generates an electrical signal at an output 226 in response to receiving the portion of the Raman optical pumping signal from the optical filter 212. The optical detector 224 typically has an optical bandwidth that is equal to or greater than the bandwidth of the optical filter 212. Numerous types of optical detectors 224 can be used.

A controller 228 is used to control the power of at least one of the optical data signals generated by the optical source and the Raman optical pump signal generated by the Raman optical pump source 208. In one embodiment, the controller 228 has an electrical input 230 that is electrically connected to the output 226 of the optical detector 224. In one embodiment, outputs 232, 232' of the controller 228 are in electrical or optical communication with a control input of at least one of the optical source 202 and the Raman optical pump source 208. In the embodiment shown in FIG. 2, the output 232 of the controller 228 is electrically coupled to a control input 234 of the optical source 202 and the output 232' of the controller 228 is optically coupled to a control input 236 of the Raman optical pump source 208. In one embodiment, the output 232' of the controller 228 is optically coupled to a control input 236 of the Raman optical pump source 208 as described in connection with FIG. 1.

The controller 228 generates at least one optical signal at the output 232, 232' that controls a power of at least one of the optical data signals and the Raman optical pumping signal in response to the electrical signal generated by the optical detector 224. The optical signal generated by the controller 228 reduces or shuts-down the power of at least one of the optical data signals and the Raman optical pumping signal when the detector 224 generates an electrical signal indicating that the Raman optical pumping signal has reached a predetermined optical power threshold level.

In one embodiment, the signal generated by the controller 228 reduces the power of at least one of the optical data signals and the Raman optical pumping signal to an eye-safe optical power level when the detector 224 generates an electrical signal indicating that the Raman optical pumping signal has reached a predetermined optical power threshold level. In another embodiment, the signal generated by the controller 228 shuts down at least one of the optical source 202 and the Raman optical pump source 208 when the detector 224 generates an electrical signal indicating that the Raman optical pumping signal has reached a predetermined optical power threshold level.

Figure 3:
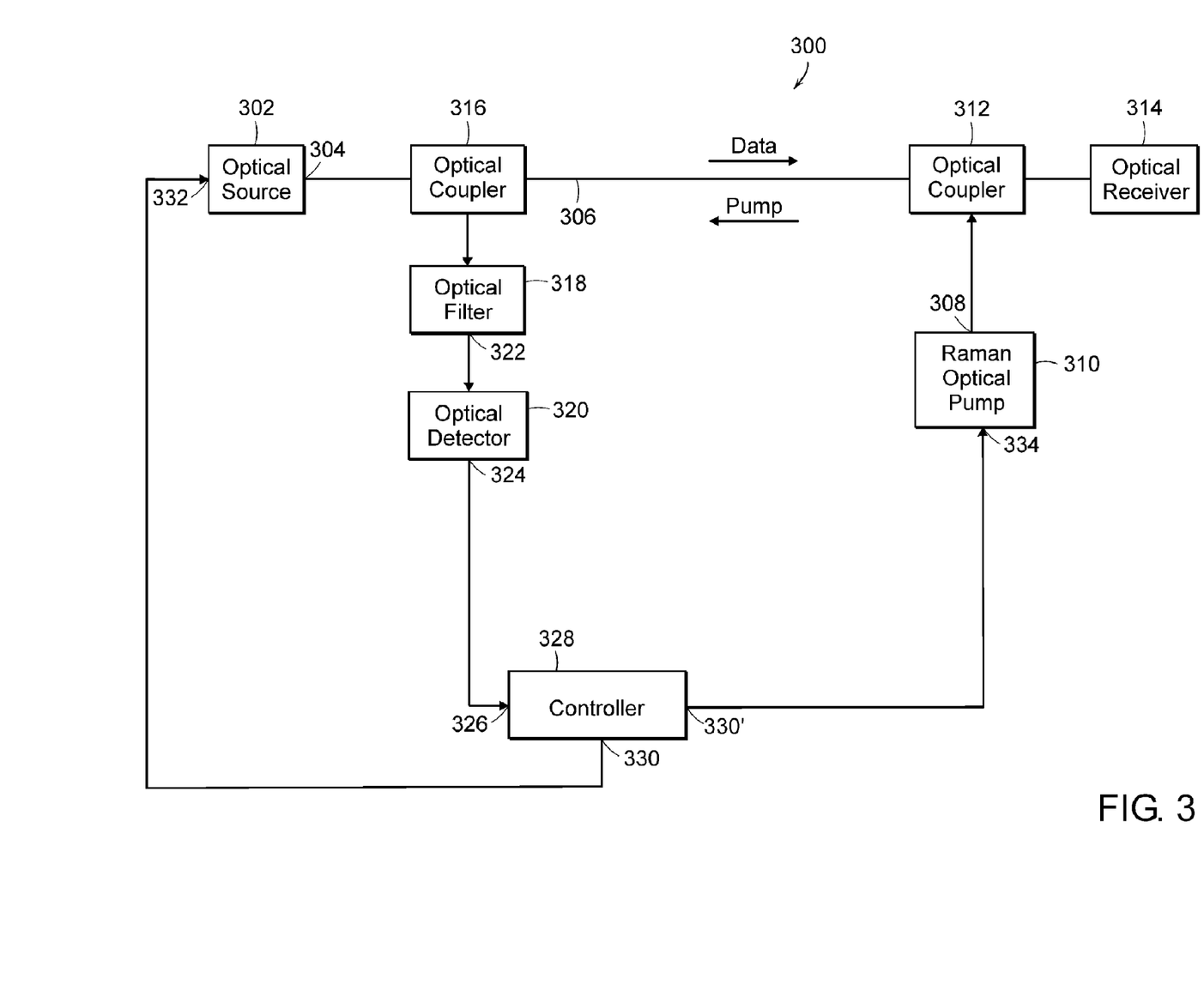
FIG. 3 illustrates one embodiment of an optical communications system with fiber break detection according to the present invention that includes a counter-propagating Raman optical pump.

FIG. 3 illustrates one embodiment of an optical communications system 300 with fiber break detection according to the present invention that includes a counter-propagating Raman optical pump. The optical communications system 300 of FIG. 3 is similar to the optical communications system 200 of FIG. 2. However, the optical pump source 202 is configured to launch the optical pumping signal in a direction that counter-propagates with the optical data signals.

The optical communications system 300 includes the optical source 302 that generates optical data signals at the output 304. The output 304 of the optical source 302 is coupled to an optical fiber span 306 that propagates the optical data signals. An output 308 of an optical Raman optical pump source 310 is optically coupled into the optical fiber span 306 with an optical coupler 312 at a location that is downstream from the optical source 302 and near the optical receiver 314. The optical coupler 312 launches the Raman optical pumping signal in a direction that counter-propagates with the optical data signals that are generated by the optical source 302.

An optical coupler 316 is positioned at a location that is near the optical data source 302. The optical coupler 316 couples a portion of the Raman optical pumping signal propagating in the optical fiber span 306 to an optical filter 318. Those skilled in the art will appreciate that in practical long haul optical communications systems, the optical fiber span 306 shown in FIG. 3 can be a single span in a multi-span optical communications system. In such systems, the data signal transmitter may be coupled into the input of a different optical fiber span.

An optical detector 320 is optically coupled to the output 322 of the optical filter 318. In one embodiment, the outputs 330, 330' of the controller 328 are electrically coupled to a control input of at least one of the optical source 302 and the Raman optical pump source 310. In the embodiment shown, the output 330 of the controller 328 is electrically coupled to a control input 332 of the optical source 302 and output 330' of the controller 328 is optically coupled to a control input 334 of the Raman optical pump source 310. In one embodiment, the optical coupling of the output 330' of the controller 328 to the control input 334 of the Raman optical pump source 310 is implemented as described in connection with FIG. 1.

A method of initiating automatic power reduction in the optical communications systems 200, 300 described in connection with FIGS. 2 and 3 includes filtering a portion of a Raman optical pumping signal from optical signals propagating in the optical fiber span 206, 306 with the optical filter 212, 318. The Raman optical pumping signal co-propagates with the optical data signals in the optical communications systems 200 that is described in connection with FIG. 2 and counter-propagates with the optical data signals in the optical communications system 300 that is described in connection with FIG. 3.

In one embodiment of the present invention, the Raman optical pumping signal is filtered to reject amplified spontaneous emissions that are generated by the Raman optical pumping signal. In some embodiments, the Raman optical pumping signal is filtered to reject back-scattered optical signals. Also, in some embodiments, the Raman optical pumping signal is filtered to reject signals that propagate in an optical supervisory channel.

The filtered portion of the Raman optical pumping signal is then detected by the optical detector 224, 320. The controller 228, 328 then generates electrical and optical signals that are related to a magnitude of the filtered portion of the Raman optical pumping signal. The power of at least one of the optical data signals and the Raman optical pumping signal propagating in the optical fiber span 206, 306 is then reduced in response to the electrical signal generated by the controller 228, 328.

In some embodiments, the power of at least one of optical data signals and the Raman optical pumping signal is reduced when the electrical signal generated by the controller 228, 328 indicates that a magnitude of the Raman optical pumping signal has reached a predetermined optical power threshold level. In some embodiments, the power of at least one of the optical data signals and the Raman optical pumping signal is reduced to an eye-safe optical power level. In other embodiments, the power of at least one of the optical data signals and the Raman optical pumping signal is reduced to zero.

Figure 4:
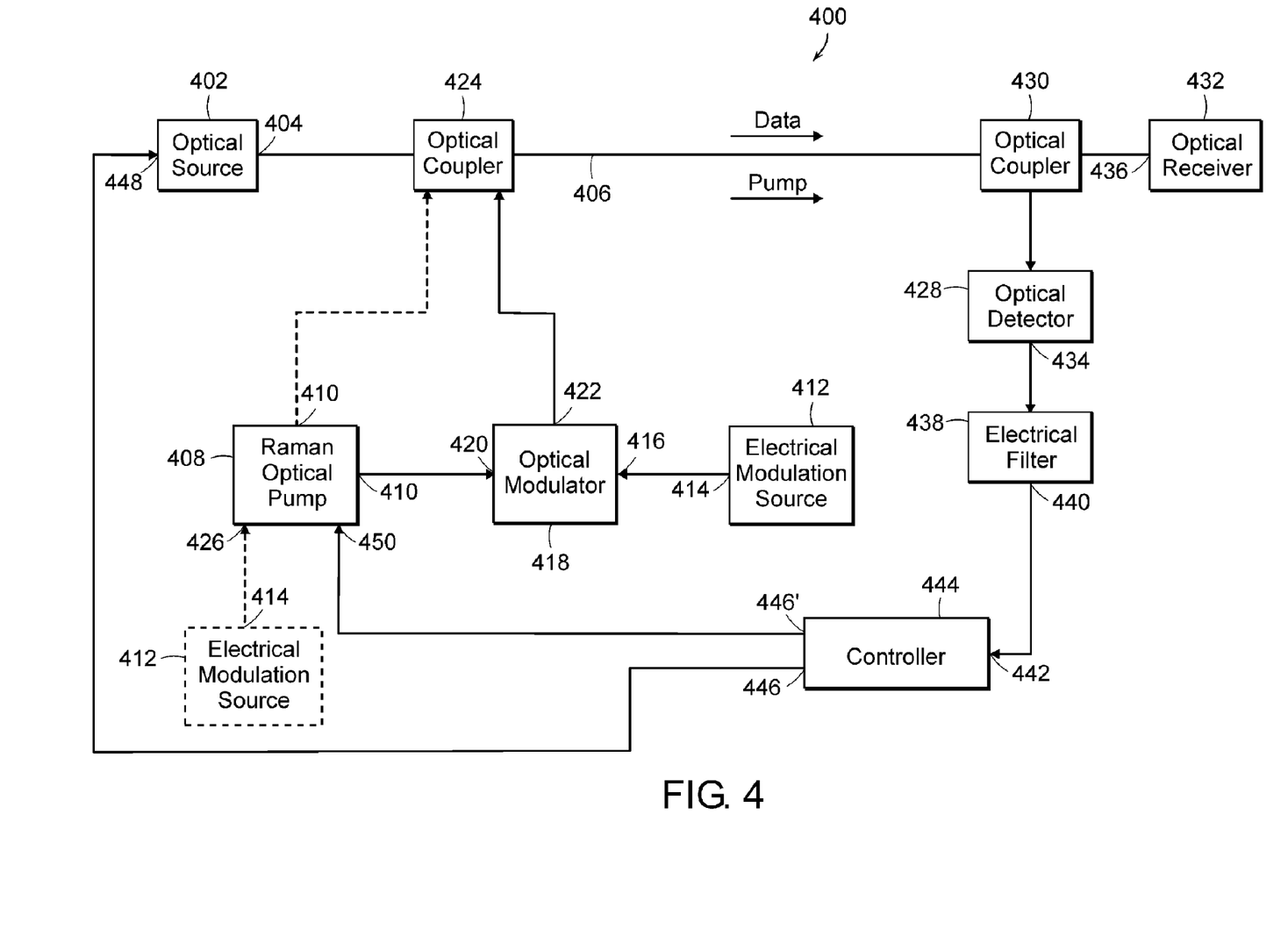
FIG. 4 illustrates one embodiment of an optical communications system with fiber break detection according to the present invention that includes a co-propagating modulated Raman optical pumping signal.

FIG. 4 illustrates one embodiment of an optical communications system 400 with fiber break detection according to the present invention that includes a co-propagating modulated Raman optical pumping signal. The optical communications system 400 includes the optical source 402 that generates optical data signals at the output 404. The output 404 of the optical source 402 is coupled to an optical fiber span 406 that propagates the optical data signals.

A Raman optical pump source 408 generates a Raman optical pumping signal at an output 410. The optical communications system 400 of FIG. 4 uses an electrical modulation signal to mark the Raman optical pumping signal. An electrical modulation source 412 generates the electrical modulation signal at an output 414. The output 414 of the electrical modulation source 412 is electrically coupled to a modulation input 416 of an optical modulator 418. The output 410 of the Raman optical pump source 408 is optically coupled to an optical input 420 of the optical modulator 418.

The output 422 of the optical modulator 418 is coupled to an optical coupler 424. Those skilled in the art will appreciate that in practical long haul optical communications systems, the optical fiber span 406 shown in FIG. 4 can be a single span in a multi-span optical communications system. In such systems, a data signal transmitter may be coupled into the input of a different optical fiber span.

The optical coupler 424 launches the Raman optical pumping signal in a direction that co-propagates with the optical data signals that are generated by the optical source 402. In the embodiment shown in FIG. 4, both the optical data signals and the optical pumping signal co-propagate in the optical fiber span 406 as indicated by the data and pump arrows that are positioned adjacent to the optical fiber span 406. In other embodiments, the optical pumping signal counter-propagates in the optical fiber span 406 with the optical data signals. In yet other embodiment, a first optical pumping signal co-propagates with the optical data signals and a second optical pumping signal counter-propagates with the optical data signals.

In an alternative embodiment, the Raman optical pump source 408 is directly modulated by the electrical modulation source 412. In this embodiment, the output 414 of the electrical modulation source 412 is electrically connected to a modulation input 426 of the Raman optical pump source 408. The output 410 of the Raman optical pump source 408 is coupled to the optical coupler 424. The electrical modulation source 412 and the electrical and optical connections in this embodiment are shown with dashed lines to indicate that this is an alternative embodiment.

An optical detector 428 is optically coupled to the optical fiber span 406 with an optical coupler 430 at a location that is downstream from the optical source 402 and near the optical receiver 432. The optical detector 428 detects a portion of the Raman optical pumping signal and generates an electrical signal an output 434 that is related to the detected signal. An input 436 of the optical receiver 432 is optically coupled to the end of the optical fiber span 406. The optical receiver 432 receives the optical data signals propagating in the optical fiber span 406 that are not coupled out of the optical fiber span 406 by the optical coupler 430.

An electrical filter 438 is electrically connected to the output 434 of the optical detector 428. The electrical filter 438 passes a signal that is related to the electrical modulation signal at an output 440. The bandwidth of the optical detector 428 is typically greater than the bandwidth of the optical filter 438. The electrical filter 438 passes the electrical modulation signal and rejects other signals to increase the sensitivity of the optical signal detected by the optical detector 428.

The output 440 of the electrical filter 438 is electrically connected to an input 442 of a controller 444. In one embodiment, outputs 446, 446' of the controller 444 are in electrical or optically communication with the control inputs of at least one of the optical source 402 and the Raman optical pump source 408. In the embodiment shown in FIG. 4, the output 446 of the controller 444 is electrically coupled to a control input 448 of the optical source 402 and the output 446' of the controller 444 is optically coupled to a control input 450 of the Raman optical pump source 408. In one embodiment, the output 446' of the controller 444 is optically coupled to a control input 450 of the Raman optical pump source 408 as described in connection with FIG. 1.

The controller 444 generates at least one electrical or optical signal at the output 446, 446' that controls a power of at least one of the optical data signals and the Raman optical pumping signal in response to the electrical signal generated by the optical detector 428. The signal generated by the controller 444 reduces or shuts-down the power of at least one of the optical data signals and the Raman optical pumping signal when the optical detector 428 generates an electrical signal indicating that the Raman optical pumping signal has reached a predetermined optical power threshold level.

In one embodiment, the signal generated by the controller 444 reduces the power of at least one of the optical data signals and the Raman optical pumping signal to an eye-safe optical power level when the optical detector 428 generates an electrical signal indicating that the Raman optical pumping signal has reached a predetermined optical power threshold level. In another embodiment, the signal generated by the controller 444 shuts down at least one of the optical source 402 and the Raman optical pump source 408 when the detector 428 generates an electrical signal indicating that the Raman optical pumping signal has reached a predetermined optical power threshold level.

Figure 5:
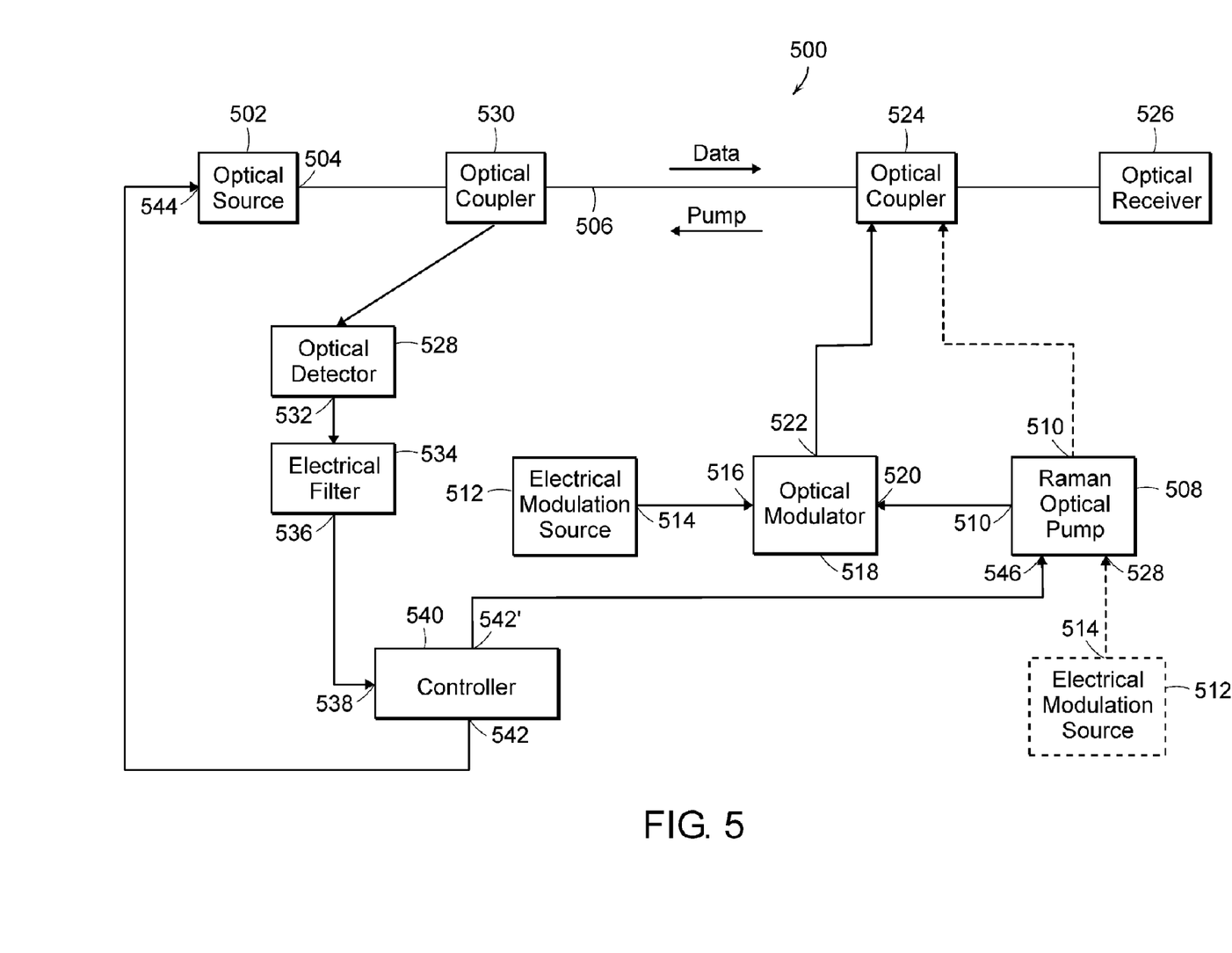
FIG. 5 illustrates one embodiment of an optical communications system with fiber break detection according to the present invention that includes a counter-propagating modulated Raman optical pumping signal.

FIG. 5 illustrates one embodiment of an optical communications system 500 with fiber break detection according to the present invention that includes a counter-propagating modulated Raman optical pumping signal. The optical communications system 500 of FIG. 5 is similar to the optical communications system 400 of FIG. 4. However, the optical pumping signal propagates in a direction that counter-propagates with the optical data signals.

The optical communications system 500 includes an optical source 502 that generates optical data signals at the output 504. The output 504 of the optical source 502 is coupled to an optical fiber span 506 that propagates the optical data signals. A Raman optical pump source 508 generates a Raman optical pumping signal at an output 510.

The optical communications system 500 of FIG. 5 also uses an electrical modulation signal to mark the Raman optical pumping signal. An electrical modulation source 512 generates the electrical modulation signal at an output 514. The output 514 of the electrical modulation source 512 is electrically coupled to a modulation input 516 of an optical modulator 518. The output 510 of the Raman optical pump source 508 is optically coupled to an optical input 520 of the optical modulator 518. The output 522 of the optical modulator 518 is optically coupled to an optical coupler 524 that is positioned at a location that is downstream from the optical source 502 and near the optical receiver 526. The optical coupler 524 launches the Raman optical pumping signal in a direction that counter-propagates with the optical data signals that are generated by the optical source 502.

In an alternative embodiment, the Raman optical pump source 508 is directly modulated by the electrical modulation source 512. In this embodiment, the output 514 of the electrical modulation source 512 is electrically connected to a modulation input 528 of the Raman optical pump source 508. The output 510 of the Raman optical pump source 508 is coupled to the optical coupler 524. The electrical modulation source 512 and the electrical and optical connections in this embodiment are shown with dashed lines to indicate that this is an alternative embodiment.

An optical detector 528 is optically coupled to the optical fiber span 506 with an optical coupler 530 that is positioned at a location near the optical source 502. The optical detector 528 detects a portion of the Raman optical pumping signal and generates an electrical signal an output 532 that is related to the detected signal.

An electrical filter 534 is electrically connected to the output 532 of the optical detector 528. The electrical filter 534 passes a signal that is related to the electrical modulation signal at an output 536. The bandwidth of the optical detector 528 is typically greater than the bandwidth of the optical filter 534. The electrical filter 534 passes the electrical modulation signal and rejects other signal, which increases the sensitivity of the optical signal detected by the optical detector 528.

The output 536 of the electrical filter 534 is electrically connected to an input 538 of a controller 540. In one embodiment, outputs 542, 542' of the controller 540 are in electrical or optical communication with control inputs of at least one of the optical source 502 and the Raman optical pump source 508. In the embodiment shown in FIG. 5, the output 542 of the controller 540 is electrically coupled to a control input 544 of the optical source 502 and the output 542' of the controller 540 is optically coupled to a control input 546 of the Raman optical pump source 508. In one embodiment, the output 542' of the controller 540 is optically coupled to the control input 546 of the Raman optical pump source 508 as described in connection with FIG. 1.

The controller 540 generates at least one electrical signal or optical signal at the output 542, 542' that controls a power of at least one of the optical data signals and the Raman optical pumping signal in response to the electrical signal generated by the optical detector 528. The at least one signal generated by the controller 540 reduces or shuts-down the power of at least one of the optical data signals and the Raman optical pumping signal when the optical detector 528 generates an electrical signal indicating that the Raman optical pumping signal has reached a predetermined optical power threshold level.

In one embodiment, the signal generated by the controller 540 reduces the power of at least one of the optical data signals and the Raman optical pumping signal to an eye-safe optical power level when the optical detector 528 generates an electrical signal indicating that the Raman optical pumping signal has reached a predetermined optical power threshold level. In another embodiment, the signal generated by the controller 540 shuts down at least one of the optical source 502 and the Raman optical pump source 508 when the detector 528 generates an electrical signal indicating that the Raman optical pumping signal has reached a predetermined optical power threshold level.

A method of initiating automatic power reduction in the optical communications systems 400, 500 described in connection with FIG. 4 and FIG. 5 includes modulating a Raman optical pumping signal with the optical modulator 518 using an electrical modulation signal generated by the electrical modulation source 512. The modulated Raman optical pumping signal is added to the optical fiber span 506 at a first location. The modulated Raman optical pumping signal propagates in the optical fiber span 506 and is then extracted from the optical fiber span 506 at a second location.

The extracted signal is then filtered or demodulated with the electrical filter 438, 534 to extract the electrical modulation signal. A magnitude of the demodulated electrical modulation signal is then measured by the controller 444, 540. A power of at least one of optical data signals and the Raman optical pumping signal is then controlled by the controller 444, 540 in response to the measured magnitude of the filtered or demodulated electrical modulation signal.

In some embodiments, the power of at least one of the optical data signals and the Raman optical pumping signal is reduced by the controller 444, 540 when the measured magnitude of the filtered or demodulated electrical modulation signal reaches a predetermined optical power threshold level. In some embodiments, the power of at least one of optical data signals and the Raman optical pumping signal is reduced to an eye-safe optical power level. In other embodiments, the power of at least one of the optical data signals and the Raman optical pumping signal is substantially reduced to zero when the measured magnitude of the demodulated electrical modulation signal reaches a predetermined optical power threshold level.

Figure 6:
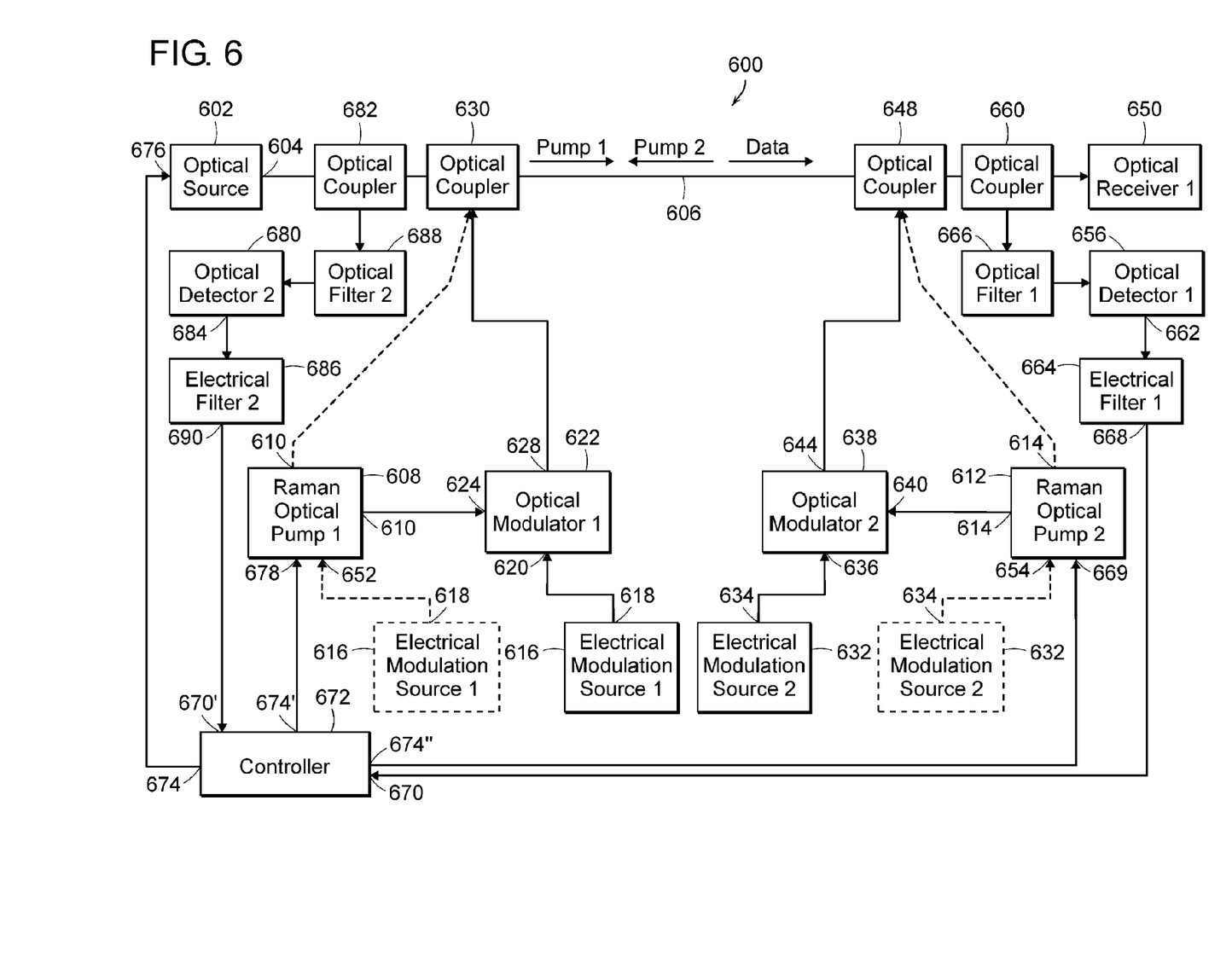
FIG. 6 illustrates one embodiment of an optical communications system with fiber break detection according to the present invention that includes both co-propagating and counter-propagating modulated Raman optical pumping signal.

FIG. 6 illustrates one embodiment of an optical communications system 600 with fiber break detection according to the present invention that includes both co-propagating and counter-propagating modulated Raman optical pumping signal. The optical communications system 600 of FIG. 6 is similar to the optical communications systems 400, 500 of FIG. 4 and FIG. 5. However, both a co-propagating and a counter-propagating optical pumping signal propagate with the optical data signals.

The optical communications system 600 includes an optical source 602 that generates optical data signals at the output 604. The output 604 of the optical source 602 is coupled to an optical fiber span 606 that propagates the optical data signals. A first Raman optical pump source 608 generates a first Raman optical pumping signal at an output 610 that co-propagates with the optical data signals generated by the optical source 602. A second Raman optical pump source 612 generates a second Raman optical pumping signal at an output 614 that counter-propagates with the optical data signals generated by the optical source 602.

The optical communications system 600 of FIG. 6 uses a first and second electrical modulation signals to mark the first and second Raman optical pumping signals, respectively. A first electrical modulation source 616 generates the first electrical modulation signal at an output 618. The output 618 of the first electrical modulation source 616 is electrically coupled to a modulation input 620 of an optical modulator 622. The output 610 of the first Raman optical pump source 608 is optically coupled to an optical input 624 of the optical modulator 622. An output 628 of the optical modulator 622 is optically coupled to an optical coupler 630 that is positioned near the optical source 602. The optical coupler 630 launches the Raman optical pumping signal in a direction that co-propagates with the optical data signals that are generated by the optical source 602.

A second electrical modulation source 632 generates the second electrical modulation signal at an output 634. The output 634 of the second electrical modulation source 632 is electrically coupled to a modulation input 636 of an optical modulator 638. The output 614 of the second Raman optical pump source 612 is optically coupled to an optical input 640 of the optical modulator 638. An output 644 of the optical modulator 638 is optically coupled to an optical coupler 648 that is positioned at a location that is downstream from the optical source 602 and near the optical receiver 650. The optical coupler 648 launches the Raman optical pumping signal in a direction that counter-propagates with the optical data signals that are generated by the optical source 602.

In an alternative embodiment, at least one of the first and the second Raman optical pump sources 608, 612 are directly modulated by a respective electrical modulation source 616, 632. For example, in the embodiment shown in FIG. 6, the output 618 of the first electrical modulation source 616 is electrically connected to a modulation input 652 of the first Raman optical pump source 608. The output 610 of the first Raman optical pump source 608 is coupled to the optical coupler 630.

In addition, the output 634 of the second electrical modulation source 632 is electrically connected to a modulation input 654 of the second Raman optical pump source 612. The output 614 of the second Raman optical pump source 612 is coupled to the optical coupler 648. The alternative first and second electrical modulation sources 616, 632 and their electrical and optical connections are shown with dashed lines in FIG. 6 to indicate that this is an alternative embodiment.

A first optical detector 656 is optically coupled to the optical fiber span 606 with an optical coupler 660 that is positioned at the location near the optical receiver 650. The optical detector 656 detects a portion of the first Raman optical pumping signal and generates an electrical signal at output 662 that is related to the detected signal.

An electrical filter 664 is electrically connected to the output 662 of the optical detector 656. The electrical filter 664 passes the electrical modulation signal and rejects other signal, which increases the sensitivity of the optical signal detected by the optical detector 656. In some embodiments, an optical filter 666 is coupled between the optical coupler 660 and the optical detector 656 to further increase the sensitivity of the optical signal detected by the optical detector 656.

The output 668 of the electrical filter 664 is electrically connected to an input 670 of a controller 672. In one embodiment, outputs 674, 674' of the controller 672 are electrically or optically connected to at least one of the optical source 602 and the first Raman optical pump source 608. In the embodiment shown in FIG. 6, the output 674 of the controller 672 is electrically coupled to a control input 676 of the optical source 602 and the output 674' of the controller 672 is electrically coupled to a control input 678 of the first Raman optical pump source 608

A second optical detector 680 is optically coupled to the optical fiber span 606 with an optical coupler 682 that is positioned at the location near the optical source 602. The optical detector 680 detects a portion of the second Raman optical pumping signal and generates an electrical signal at an output 684 that is related to the detected signal.

An electrical filter 686 is electrically connected to the output 684 of the optical detector 680. The electrical filter 686 passes the electrical modulation signal and rejects other signals, which increases the sensitivity of the optical signal detected by the optical detector 680. In some embodiments, an optical filter 688 is coupled between the optical coupler 682 and the optical detector 680 to further increase the sensitivity of the optical signal detected by the optical detector 680.

The output 690 of the electrical filter 686 is electrically connected to an input 670' of a controller 672. In one embodiment, outputs 674, 674" of the controller 672 are electrically or optically connected to at least one of the optical source 602 and the second Raman optical pump source 612. In the embodiment shown in FIG. 6, the output 674 of the controller 672 is electrically coupled to the control input 676 of the optical source 602 and the output 674" of the controller 672 is optically coupled to a control input 669 of the second Raman optical pump source 612 as described in connection with FIG. 1.

The controller 672 generates at least one electrical signal at the output 674, 674', 674" that controls a power of at least one of the optical data signals, the first Raman optical pumping signal, and the second Raman optical pumping signal in response to the electrical signal generated by at least one of the optical detectors 656, 680. The signal generated by the controller 672 reduces or shuts-down the power of at least one of the optical data signals, the first Raman optical pumping signal, and the second Raman optical pumping signal when at least one of the optical detectors 656, 680 generate an electrical signal indicating that at least one of the first and second Raman optical pumping signal has reached a predetermined optical power threshold level.

In one embodiment, the signal generated by the controller 672 reduces the power of at least one of the optical data signals, the first Raman optical pumping signal, and the second Raman optical pumping signal to an eye-safe optical power level when the optical detectors 656, 680 generates an electrical signal indicating that the first and/or second Raman optical pumping signal has reached a predetermined optical power threshold level. In another embodiment, the signal generated by the controller 672 shuts down at least one of the optical source 602, the first Raman optical pump source 608, and the second Raman optical pump source 612 when the optical detectors 656, 680 generate an electrical signal indicating that the Raman optical pumping signal has reached a predetermined optical power threshold level.

In operation, the first Raman optical pump source 608 generates a first Raman optical pumping signal having a first wavelength that co-propagates with the optical data signals. A second Raman optical pump source 612 generates a second Raman optical pumping signal having a second wavelength that counter-propagates with the optical data signals. The first and the second Raman optical pumping signals amplify the optical data signals propagating on the optical fiber span 606.

In one embodiment, the first and the second optical filters 666, 688 are optically coupled to the optical fiber span 606. The first and the second optical filter 666, 688 pass a portion of one of the first and the second Raman optical pumping signals and reject other optical signals. The first and the second optical detector 656, 680 are optically coupled to respective outputs of the first and the second optical filters 666, 688. The first and the second optical detectors 656, 680 generate electrical signals at their respective outputs in response to receiving the respective portions of the first and the second Raman optical pumping signals. The first and second electrical filters 664, 686 are electrically connected to the outputs 662, 684 of the optical detectors 656, 680. The first and second electrical filters 664, 686 pass the electrical modulation signal and reject other signals to increase the sensitivity of the optical signal detected by the first and second optical detectors 656, 680.

The first and the second inputs 670, 670' of the controller 672 are electrically connected to respective outputs of the first and second electrical filters 664, 686. The outputs 674, 674', 674" of the controller 672 are electrically and optically connected to the optical source, the first Raman pumping source 608, and the second Raman pumping source 612. The controller 672 generates a signal at one or more of the outputs 674, 674', 674" that controls a power of at least one of the optical data signals, the first Raman optical pumping signal, and the second Raman optical pumping signal in response to electrical signals generated by at least one of the first and the second optical detectors 656, 680.

Equivalents

While the present teachings are described in conjunction with various embodiments and examples, it is not intended that the present teachings be limited to such embodiments. On the contrary, the present teachings encompass various alternatives, modifications and equivalents, as will be appreciated by those of skill in the art, may be made therein without departing from the spirit and scope of the invention as defined by the appended claims.

What is claimed is:

1. Apparatus for initiating automatic power reduction in an optical communications system with Raman amplification, the apparatus comprising:
   a) means for selecting a portion of a Raman optical pumping signal from optical signals propagating on an optical fiber span; said means for selecting being located proximate to an end of said optical fiber span opposite an end of said optical fiber span where the Raman optical pumping signal is injected into said optical fiber span
   b) means for generating a signal that is related to a magnitude of the selected portion of the Raman optical pumping signal; and
   c) means for reducing a power of at least one of optical data signals and the optical pumping signals propagating in the optical fiber span in response to the generated signal.

2. Apparatus for initiating automatic power reduction in an optical communications system with Raman amplification, the apparatus comprising:
   a) means for filtering a portion of a Raman optical pumping signal from optical data signals propagating in an optical fiber span; said means for filtering being located proximate to an end of said optical fiber span opposite an end of said optical fiber span where the Raman optical pumping signal is injected into said optical fiber span
   b) means for generating an electrical signal that is related to a magnitude of the filtered portion of the Raman optical pumping signal; and
   c) means for reducing a power of at least one of the optical data signals and the Raman optical pumping signal propagating in the optical fiber span in response to the electrical signal.

3. The apparatus of claim 2 wherein the Raman optical pumping signal co-propagates with the optical data signals.

4. The apparatus of claim 2 wherein the Raman optical pumping signal counter-propagates with the optical data signals.

5. The apparatus of claim 2 wherein the means for reducing the power of at least one of optical data signals and the Raman optical pumping signal comprises means for reducing the power of at least one of the optical data signals and the Raman optical pumping signal when the electrical signal indicates that a magnitude of the Raman optical pumping signal reaches a predetermined optical power threshold level.

6. The apparatus of claim 5 wherein the power of the at least one of the optical data signals and the Raman optical pumping signal is reduced to an eye-safe optical power level.

7. The apparatus of claim 2 wherein the means for reducing the power of at least one of the optical data signals and the Raman optical pump signal comprises means for reducing the power of at least one of the optical data signals and the Raman optical pumping signal to zero when the electrical signal indicates that the magnitude of the Raman optical pumping signal reaches a predetermined optical power threshold level.

8. The apparatus of claim 2 wherein the means for filtering the portion of the Raman optical pumping signal comprises rejecting amplified spontaneous emission that are generated by the Raman optical pumping signal.

9. The apparatus of claim 2 wherein the means for filtering the portion of the Raman optical pumping signal comprises rejecting back-scattered optical signals.

10. The apparayus of claim 2 wherein the means for filtering the portion of the Raman optical pumping signal comprises rejecting signals that propagate in an optical superviory channel.

* * * * *